(12) United States Patent
Huang et al.

(10) Patent No.: US 8,812,046 B2
(45) Date of Patent: Aug. 19, 2014

(54) SYSTEM AND METHOD FOR SELF-OPTIMIZATION OF INTERFERENCE COORDINATION IN COMMUNICATION SYSTEMS

(75) Inventors: Leping Huang, Tokyo (JP); Kodu Shu, Kawasaki (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/599,850

(22) Filed: Aug. 30, 2012

(65) Prior Publication Data

US 2012/0329460 A1     Dec. 27, 2012

Related U.S. Application Data

(62) Division of application No. 12/058,144, filed on Mar. 28, 2008, now abandoned.

(60) Provisional application No. 60/921,247, filed on Mar. 30, 2007.

(51) Int. Cl.
| | |
|---|---|
| *H04B 7/00* | (2006.01) |
| *H04B 7/02* | (2006.01) |
| *H04W 72/04* | (2009.01) |
| *H04L 1/18* | (2006.01) |
| *H04W 72/08* | (2009.01) |

(52) U.S. Cl.
CPC .......... *H04W 72/0413* (2013.01); *H04B 7/024* (2013.01); *H04L 1/1867* (2013.01); *H04W 72/082* (2013.01)
USPC ........ 455/522; 455/422.1; 455/436; 455/450; 455/452.2

(58) Field of Classification Search
USPC ................ 455/428, 432.1–453; 370/328–333
See application file for complete search history.

(56) References Cited

U.S. PATENT DOCUMENTS

| | | | |
|---|---|---|---|
| 6,970,713 B2 | 11/2005 | Roy et al. | |
| 8,098,644 B2 * | 1/2012 | Xiao et al. | 370/344 |

(Continued)

FOREIGN PATENT DOCUMENTS

| | | |
|---|---|---|
| WO | 0024206 | 4/2000 |
| WO | 0028758 | 5/2000 |
| WO | 2005114859 | 12/2005 |

OTHER PUBLICATIONS

"3rd Generation Partnership Project; Technical Specification Group Radio Access Network; Physical layer aspects for evolved Universal Terrestrial Radio Access (UTRA), (Release 7)," 3GPP TR 25.814, V7.0.0, Jun. 2006, pp. 1 126, 3GPP Organizational Partners, Sophia Antipolis Valbonne, France.

(Continued)

*Primary Examiner* — Dai A Phuong
(74) *Attorney, Agent, or Firm* — Squire Patton Boggs (US) LLP

(57) ABSTRACT

In accordance with aspects of the present invention, a method, apparatus and system are provided for self-optimization of interference coordination in communication systems. In one embodiment, the apparatus includes a measurement and reporting subsystem configured to perform measurements regarding a status of the apparatus and to provide a reliability report to a base station as a function thereof. The apparatus is configured to notify a strongest interferer about the status via the reliability report. In another embodiment, the apparatus includes a measurement report handler configured to process a reliability report received from a user equipment and an interference coordination subsystem configured to adjust interference coordination parameters based on the reliability report received from the user equipment.

19 Claims, 11 Drawing Sheets

(56) References Cited

U.S. PATENT DOCUMENTS

| | | | |
|---|---|---|---|
| 2002/0090965 A1* | 7/2002 | Chen et al. | 455/522 |
| 2003/0151799 A1* | 8/2003 | Wight et al. | 359/334 |
| 2005/0265222 A1 | 12/2005 | Gerlach | |
| 2006/0292989 A1 | 12/2006 | Gerlach et al. | |
| 2007/0004423 A1 | 1/2007 | Gerlach et al. | |
| 2007/0010203 A1 | 1/2007 | Wee | |
| 2007/0042784 A1 | 2/2007 | Anderson | |
| 2007/0082619 A1* | 4/2007 | Zhang et al. | 455/69 |
| 2007/0082620 A1 | 4/2007 | Zhang et al. | |
| 2007/0147487 A1* | 6/2007 | Frederiksen et al. | 375/222 |
| 2007/0178930 A1* | 8/2007 | Xiao et al. | 455/522 |
| 2007/0213014 A1* | 9/2007 | Meacham et al. | 455/69 |
| 2007/0223510 A1 | 9/2007 | Joo | |
| 2007/0259668 A1 | 11/2007 | Legg | |
| 2007/0280175 A1 | 12/2007 | Cheng et al. | |
| 2008/0057933 A1 | 3/2008 | Brunner | |
| 2008/0070610 A1* | 3/2008 | Nishio | 455/509 |
| 2008/0095133 A1 | 4/2008 | Kodo et al. | |
| 2008/0182580 A1* | 7/2008 | Laroia et al. | 455/440 |
| 2009/0054060 A1 | 2/2009 | Jones | |
| 2010/0027502 A1* | 2/2010 | Chen et al. | 370/330 |

OTHER PUBLICATIONS

"Open Loop DL Transmit Diversity for Common Control Channels," 3GPP TSG RAN WG1 #47bis Meeting, Contribution R1-070390, Agenda Item 6.7.5, Jan. 15-19, 2007, pp. 1-9, Nokia, Sorrento, Italy.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300, V1.0.0, Mar. 2007, pp. 1-82, 3GPP Organizational Partners, Sophia Antipolis Valbonne, France.

Notification of Transmittal of the International Search Report and the Written Opinion of the International Authority, or the Declaration issued for International Application No. PCT/IB2008/051178 dated Oct. 6, 2008 (13 pages).

"3rd Generation Partnership Project; Technical Specification Group Radio Access Network; Physical layer aspects for evolved Universal Terrestrial Radio Access (UTRA)(Release 7)," Paper No. XP002481245, Sep. 1, 2006, pp. 1-132.

* cited by examiner

SYSTEM AND METHOD FOR SELF-OPTIMIZATION OF INTERFERENCE COORDINATION IN COMMUNICATION SYSTEMS

CROSS-REFERENCE TO RELATED APPLICATIONS

This application is a divisional of U.S. patent application Ser. No. 12/058,144, filed on Mar. 28, 2008, which claims the benefit of U.S. Provisional Application No. 60/921,247, filed on Mar. 30, 2007. The disclosures of the prior applications are hereby incorporated by reference in their entirety.

TECHNICAL FIELD

The present invention is directed, in general, to communication systems and, more particularly, to a system and method for self-optimization of interference coordination in communication systems.

BACKGROUND

As wireless communication systems such as cellular telephone, satellite, and microwave communication systems become widely deployed and continue to attract a growing number of users, there is a pressing need to accommodate a large and variable number of communication devices transmitting a growing volume of data with fixed resources. Traditional communication system designs employing a fixed resource (e.g., a fixed data rate for each communication device) have become challenged to provide high, but flexible, data transmission rates in view of the rapidly growing customer base and expanding levels of service.

The Third Generation Partnership Project Long Term Evolution ("3GPP LTE") is the name generally used to describe an ongoing effort across the industry to improve the universal mobile telecommunications system ("UMTS") for mobile communications to cope with continuing new requirements and the growing base of users. The goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS.

One of the areas addressed by the ongoing efforts is interference between cells in a wireless communication system. Interference coordination (also referred to as interference mitigation or interference control) is a generic term for any kind of system-level radio resource management-based interference mitigation scheme such as interference coordination and avoidance, inter-cell interference randomization, and inter-cell interference cancellation. Soft frequency reuse refers to one type of interference coordination scheme for evolved UMTS terrestrial radio access network ("e-UTRAN") communication systems, which provides frequency coordination (or time-frequency coordination for synchronous systems) by applying power restrictions (reduced power) in certain time-frequency domains to achieve power coordination.

Within various interference coordination schemes in the 3GPP LTE project, power-sequence-based interference control, which is a soft frequency reuse interference coordination scheme, is the most commonly studied class of interference coordination schemes. In a soft frequency reuse-based interference coordination scheme, frequency (or time) resources are divided into different power level groups and an allocation procedure is utilized to divide the resources. In the allocation procedure, each sector is assigned portions of the frequency sub-bands according to a communication system plan, wherein different power constraints are assigned to different portions of frequency bands. Flexibility for interference reduction is achieved by varying power levels in the bands. Soft frequency reuse schemes can alleviate interference between cells because a fraction of the bandwidth in each cell is not used (affecting frequency reuse) and/or a penalty is not incurred because the fraction of the bandwidth in each cell is partially overlapped (as seen from the fractional frequency reuse schemes).

Proposals have been presented in the 3GPP LTE project for signaling to support adaptive interference control schemes that have focused on both a raw physical layer measurements point of view, such as the exchange of user equipment channel quality indicator measurements or pilot measurements between cells and radio resource management, and a quality-of-service point of view. While the proposals have addressed the interference coordination, there is still an opportunity for improvement therefor. Thus, considering the current limitations of communication systems including cellular networks, a system and method to manage interference between elements of a communication system to provide a higher level of communication reliability, particularly at the edge of the coverage area of a base station, that does not add substantially to signaling overhead and that is operable in real-time would be beneficial.

Accordingly, what is needed in the art is a system and method to self-optimize a level of interference between elements of a communication system in an interference coordination scheme. Advantageously, the reliability of handover signaling would thereby be increased. Otherwise, communication systems such as 3GPP LTE-compatible communication systems employing handover signaling may lose a competitive edge against other communication systems. Additionally, the system and method to self-optimize a level of interference between elements of a communication system to increase reliable handover should avoid inducing significant architectural changes to the existing communication systems.

SUMMARY OF THE INVENTION

These and other problems are generally solved or circumvented, and technical advantages are generally achieved, by embodiments of the present invention, which include a method, apparatus, and system to adaptively manage interference between elements of a communication system in a self-optimization process. In one embodiment, the apparatus (e.g., user equipment) includes a measurement and reporting subsystem configured to perform measurements regarding a status of the apparatus and to provide a reliability report to a base station as a function thereof. The user equipment is configured to notify a strongest interferer about the status via the reliability report. In another embodiment, the apparatus (e.g., a base station) includes a measurement report handler configured to process a reliability report received from a user equipment and an interference coordination subsystem configured to adjust interference coordination parameters based on the reliability report received from the user equipment.

In another aspect, the present invention provides a communication system including user equipment and a base station. In one embodiment, the user equipment includes a measurement and reporting subsystem configured to perform measurements regarding a status of the user equipment and to provide a reliability report to a base station as a function thereof. The base station includes a measurement report handler configured to process the reliability report received from the user equipment, and an interference coordination subsystem configured to adjust interference coordination parameters based on the reliability report received from the user equipment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

Figure 1:
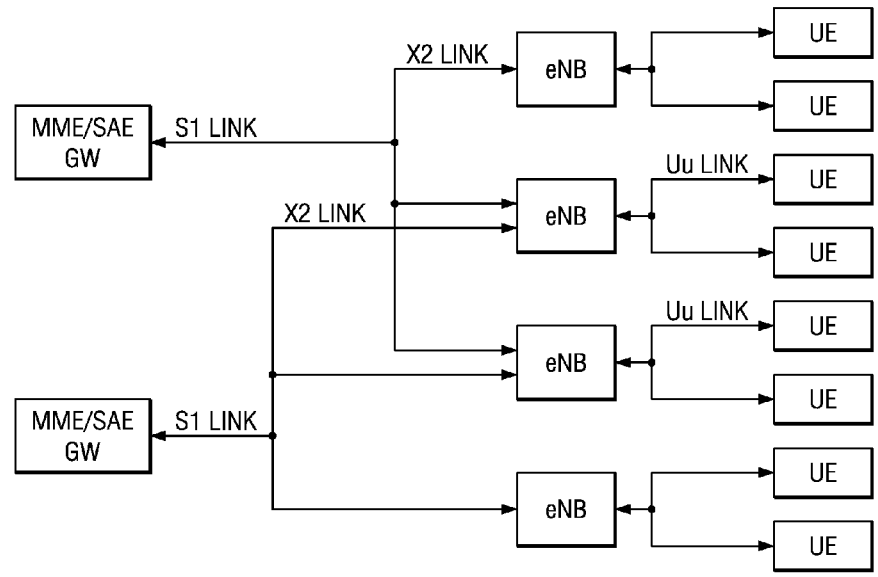
FIGS. 1 and 2 illustrate system level diagrams of a communication system including a wireless communication system that provides an environment for the application of the principles of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Proposals have been presented in the 3GPP LTE project for signaling to support adaptive interference control schemes. For example, as provided in 3GPP TR 25.814, referred to as "3rd Generation Partnership Project; Technical Specification Group Radio Access Network; Physical layer aspects for evolved Universal Terrestrial Radio Access (UTRA), (Release 7)," V7.0.0 (2006-06), which is incorporated herein by reference, three approaches to inter-cell interference mitigation are currently being considered, namely, inter-cell interference randomization, inter-cell interference cancellation, and inter-cell interference coordination and avoidance. (See, e.g., Section 7.2.1.6.) The different approaches may, at least to some extent, complement one another and are not necessarily mutually exclusive.

Section 7.1.2.6.1 of 3GPP TR 25.814 deals with inter-cell interference randomization, while section 7.1.2.6.2 deals with inter-cell interference cancellation. The latter section provides that the user equipment is signaled whether it can perform a cancellation of the received inter-cell interference and inter-cell signaling, and interfering signal configurations (e.g., interleaver pattern identification, modulation scheme, forward error correction scheme and coding rate) are also signaled to the user equipment.

In section 7.1.2.6.3 of 3GPP TR 25.814, a common theme of inter-cell interference coordination and avoidance is to apply restrictions to the downlink resource management (configuration for the common channels and scheduling for the non-common channels) in a coordinated way between cells. These restrictions can be in the form of restrictions on what time and frequency resources are available to the resource manager, or restrictions on the transmit power that can be applied to certain time and frequency resources. The restrictions within a cell provide the possibility for improvement in a signal-to-noise plus interference ratio and cell edge data rates and coverage on the corresponding time and frequency resources in a neighbor cell.

It is further noted that different assumptions can be made regarding user equipment measurement and reporting to support downlink interference coordination. In a first alternative, no additional user equipment measurement and reporting is needed beyond the channel quality indictor reports employed to support channel-dependent scheduling and link adaptation. In a second alternative, additional user equipment measurement and reporting of average path loss (including shadowing) to current and neighboring cells are needed. In a third alternative and in addition to the measurements and reporting of the second alternative, additional measurement and reporting are made on the average interference for frequency reuse sets.

It is further noted that inter-cell interference coordination employs communication between different communication system nodes (e.g., base stations) to set and reconfigure the above mentioned scheduler restrictions. Two cases are considered, namely, static interference coordination, wherein reconfiguration of the restrictions is completed on a time scale corresponding to days and the inter-node communication is very limited (basically with a rate of the order of days), and semi-static interference coordination, wherein reconfiguration of the restrictions is performed on a time scale corresponding to seconds or longer.

The inter-node communication corresponds to information employed to decide on reconfiguration of the scheduler restrictions. Examples of communicated information are given as traffic distribution within the different cells, and the downlink interference contribution from a source to a target cell, for instance. The inter-node communication also applies to the actual reconfiguration decisions. Most of the current semi-static interference coordination schemes require a base station to exchange such information with a lot of neighboring base stations frequently. This increases the complexity of the communication system and causes a large amount of signaling overhead thereon.

It should also be understood as described in 3GPP TS 36.300, referred to as the "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," V1.0.0 (2007-03), which is incorporated herein by reference, a self-configuration process is defined as a process wherein newly deployed nodes are configured by automatic installation procedures to set the necessary basic configuration for system operation. (See, e.g., Section 22.1.) This process works in a pre-operational state. The pre-operational state is understood as the state from when the base station is powered up and has backbone connectivity before the radio frequency transmitter is switched on. The functions handled in the pre-operational state include basic setup and initial radio configuration.

In view of the foregoing, the present invention will be described with respect to exemplary embodiments in a specific context of adaptively managing interference between elements of a communication system in a self-optimization process. In general, embodiments of the invention may be applied to any form of communication system and network such as a wireless communication system and network. An exemplary embodiment of the present invention will now be described. This is merely to illustrate one way of implementing the invention, without limiting the scope or coverage of what is described elsewhere in this application.

The possibility to perform inter-cell interference cancellation at the user equipment is considered irrespective of the interference mitigation scheme adopted at the transmitter. The radio interface description should facilitate the acquisition of channel parameters of a limited number of (strongest) interfering cells (e.g., through orthogonal reference signals).

Referring initially to FIG. 1, illustrated is a system level diagram of a communication system including a wireless communication system that provides an environment for the application of the principles of the present invention. The wireless communication system may be configured to provide evolved UMTS terrestrial radio access network ("e-UTRAN") universal mobile telecommunications services. A mobile management entity ("MME")/system architecture evolution gateway ("SAE GW") provides control functionality for an e-UTRAN node B (designated "eNB," an "evolved node B," also referred to as a "base station") via an S1 communication link. The base stations communicate via an X2 communication link. The various communication links are typically fiber, microwave, or other high-frequency metallic communication paths such as coaxial links, or combinations thereof.

The base stations communicate with user equipment (designated "UE"), which is typically a mobile transceiver carried by a user. Thus, communication links (designated "Uu" communication links) coupling the base stations to the user equipment are air links employing a wireless communication signal such as a 1.8 gigahertz ("GHz") orthogonal frequency division multiplex ("OFDM") signal.

Figure 2:
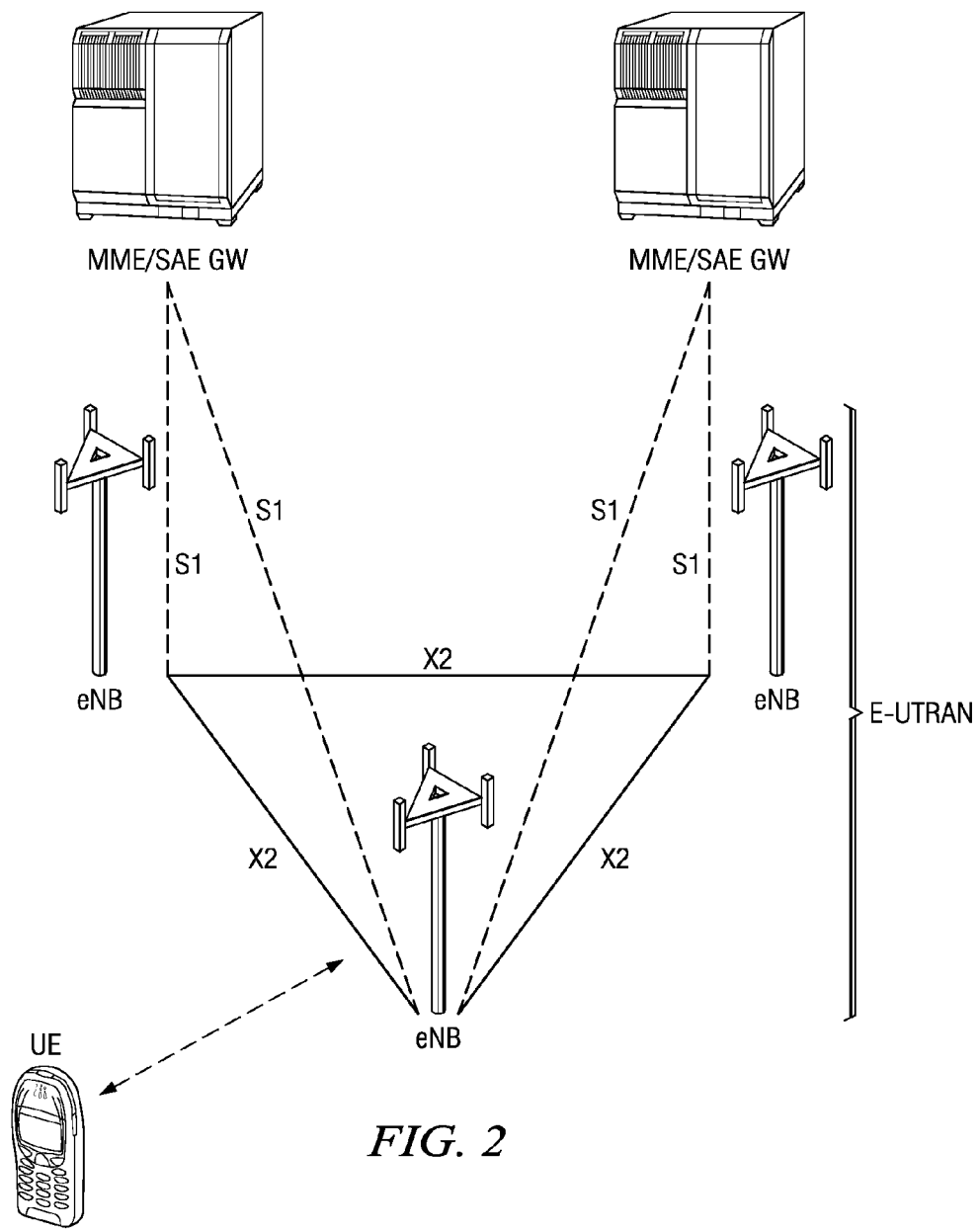

Turning now to FIG. 2, illustrated is a system level diagram of a communication system including a wireless communication system that provides an environment for the application of the principles of the present invention. The wireless communication system provides an e-UTRAN architecture including base stations (designated "eNBs") providing e-UTRA user plane (packet data convergence protocol/radio link control/media access control/physical) and control plane (radio resource control) protocol terminations towards user equipment (designated "UE"). The base stations are interconnected with an X2 interface or communication link. The base stations are also connected by an S1 interface or communication link to an evolved packet core ("EPC") including a mobile management entity ("MME")/system architecture evolution gateway ("SAE GW"). The S1 interface supports a multiple entity relationship between the mobile management entity/system architecture evolution gateway and the base stations. For applications supporting inter-public land mobile handover, inter-eNB active mode mobility is supported by the mobile management entity/system architecture evolution gateway relocation via the S1 interface.

The base stations may host functions such as radio resource management (e.g., internet protocol ("IP") header compression and encryption of user data streams, ciphering of user data streams, radio bearer control, radio admission control, connection mobility control, dynamic allocation of resources to user equipment in both the uplink and the downlink), selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway may host functions such as distribution of paging messages to the base stations, security control, termination of U-plane packets for paging reasons, switching of U-plane for support of the user equipment mobility, idle state mobility control and system architecture evolution bearer control. The user equipment receives an allocation of a group of information blocks from the base stations.

Figure 3:
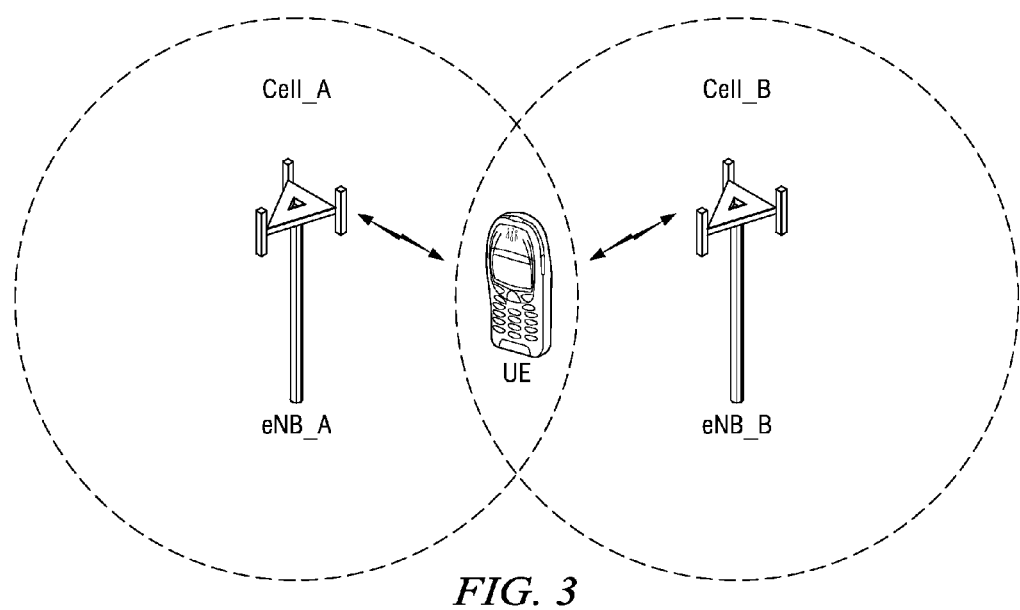
FIGS. 3 and 4 illustrate system level diagrams of a wireless communication system that provides an environment for the application of the principles of the present invention.

Turning now to FIG. 3, illustrated is a system level diagram of a wireless communication system that provides an environment for the application of the principles of the present invention. In the illustrated embodiment, the wireless communication system is a cellular communication system that includes first and second base stations eNB_A, eNB_B and user equipment UE. As illustrated herein, each base station eNB_A, eNB_B covers a cell designated as Cell_A for the first base station eNB_A and Cell_B for the second base station eNB_B. In a multicell environment, the user equipment UE may receive a signal from one or more neighboring cells. The wireless communication system as illustrated in FIG. 3 is frequently employed to provide high data-rate communication services such as video transmissions as well as large quantities of raw data from user-generated files. Those skilled in the art should also understand that the user equipment may take the form of a mobile station including a cellular telephone, a personal digital assistant ("PDA") having wireless communication capabilities, a portable computer having wireless communication capabilities, an image capture device such as a digital camera having wireless communication capabilities, a gaming device having wireless communication capabilities, a music storage and playback appliance having wireless communication capabilities, an internet appliance permitting wireless internet access and browsing, as well as a portable unit or terminal that incorporates combinations of such functions.

During a handover ("HO") event, a first base station eNB_A may be considered a source base station (i.e., the base station (or "cell") to which the user equipment UE is currently connected and communicating in an associated serving cell). The second base station eNB_B may be considered a target base station (i.e., the base station to which the user equipment UE is to be connected and communicating with in the target cell after the handover procedure is completed). The serving cell and the target cell may at least partially overlap one another in served area.

Handover refers generally to the process of transferring an ongoing communication session from one radio channel connected to a communication system to another. Handover may be performed between channels within a single cell (intra-base station handover), or between channels in different cells (inter-base station handover). Handover generally occurs when user equipment moves away from the area covered by a serving cell into the area covered by a target cell. The ongoing communication session is transferred to the target cell to avoid termination thereof when the user equipment moves outside a range of the serving cell. A handover may also occur when the capacity for accommodating new communication sessions in a serving cell is used up, and an existing or newly originated communication session from user equipment that is located in an area overlapping a target cell is transferred thereto to free up capacity in the serving cell for other users connected to the serving cell. A handover may also be performed to transfer a communication session from a rapidly moving user equipment such as user equipment in a moving vehicle connected to a large, umbrella-type cell, when the user equipment stops, thereby allowing the user equipment to be transferred to a smaller macrocell or even to a microcell to free up capacity in the umbrella cell for other fast-traveling user equipment.

Figure 4:
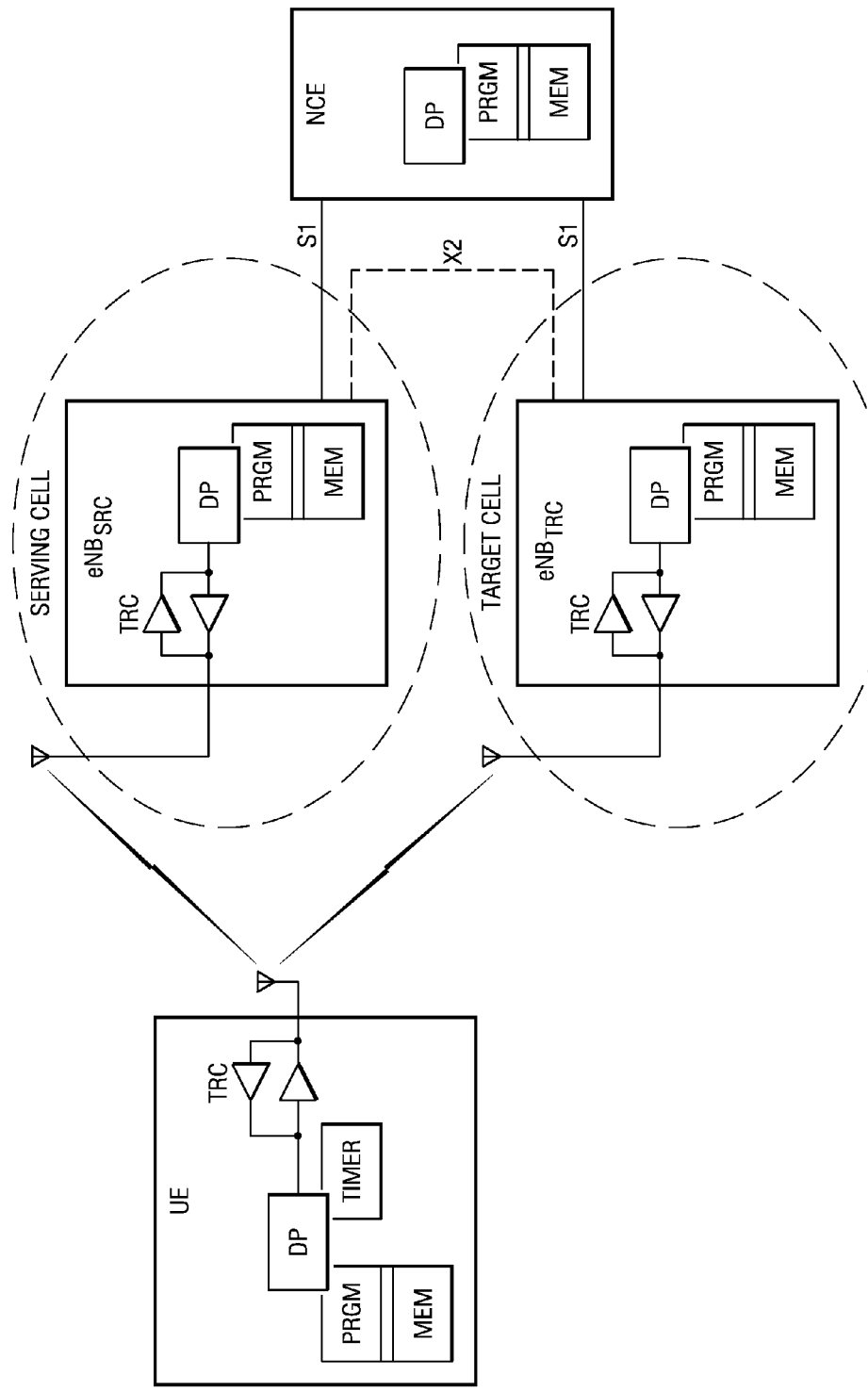

Turning now to FIG. 4, illustrated is a system level diagram of a wireless communication system that provides an environment for the application of the principles of the present invention. The wireless communication system includes user equipment (designated "UE") adapted to communication with a source base station (designated "$eNB_{SRC}$") in a serving cell and a target base station (designated "$eNB_{TRC}$") in a target cell, which are coupled to a network control element (designated "NCE") such as an access gateway. The serving cell and the target cell may at least partially overlap, not shown. Prior to a handover event, the user equipment is connected to and communicates with the source base station. After the handover event, however, the user equipment is connected to and communicates with the target base station.

The user equipment includes a data processor (designated "DP"), a memory (designated "MEM") that stores programs (designated "PRGM"), a timer (designated "TIMER") and a radio frequency transceiver (designated "TRC") for bidirectional wireless communications with the base stations. The base stations include a data processor (also designated "DP"), a memory (also designated "MEM") that stores programs (also designated "PRGM"), and a radio frequency transceiver (also designated "TRC") for bidirectional wireless communications with the user equipment. Additionally, the network control element includes a data processor (also designated "DP"), and a memory (also designated "MEM") that stores programs (also designated "PRGM"). In general, the base stations provide the e-UTRA user plane (e.g., radio link control/media access control/physical) and control plane (e.g., radio resource control) protocol terminations toward the user equipment. The base stations communicate with the network control element via an S1 interface or communication link, and are interconnected via X2 interface or communication link.

The memory as introduced above may be of any type suitable to the local technical environment and may be implemented using any suitable data storage technology such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors ("DSPs") and processors based on a multi-core processor architecture, as non-limiting examples. The programs include program instructions that, when executed by the associated data processor, enable the electronic device to perform tasks as described herein. Exemplary embodiments of the system, subsystems and modules as described herein may be implemented at least in part by computer software executable by the data processors of the user equipment and base stations, or by hardware, or combinations thereof.

Figure 5:
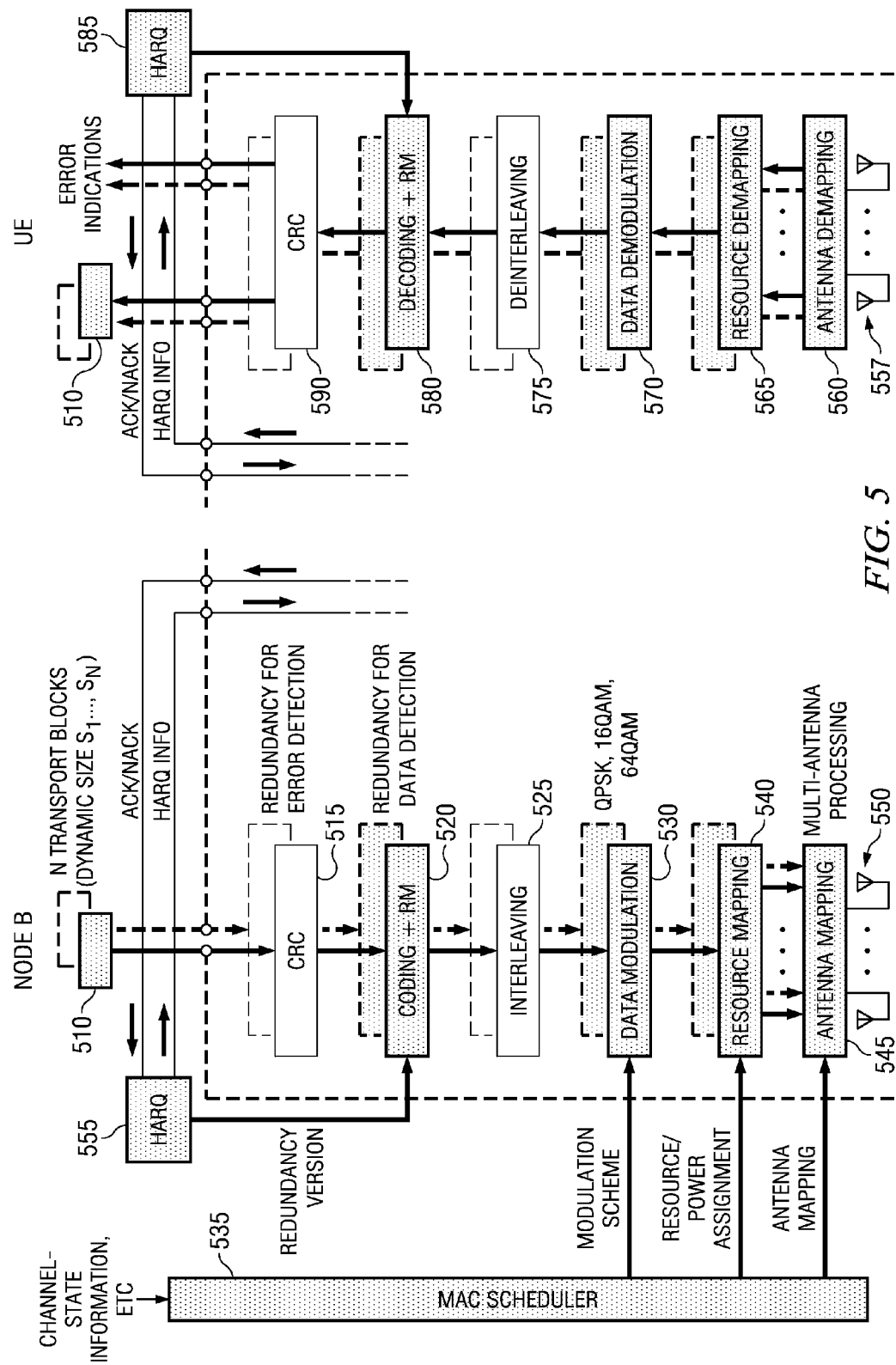
FIGS. 5 and 6 illustrate block diagrams of embodiments of user equipment and a base station of a communication system demonstrating, respectively, downlink and uplink communication between the user equipment and the base station constructed in accordance with the principles of the present invention.

Turning now to FIG. 5, illustrated is a block diagram of an embodiment of user equipment and a base station of a communication system constructed in accordance with the principles of the present invention. The illustrated communication system demonstrates downlink communication from the base station to the user equipment. The user equipment (designated "UE") and base station (designated "Node B") are compatible with 3GPP TS 36.300, as introduced above.

The base station receives transport information (designated "transport blocks") 510 for the user equipment and provides the transport information to a cyclic redundancy check module (designated "CRC") 515 for error detection. The transport information is thereafter provided to a coding module (designated "Coding+RM") 520 for performing coding and retransmission functions for the transport information.

An interleaving module 525 of the base station interleaves other information within the transport information. The base station also includes a data modulation module 530 for modulating the transport information using, for instance, quadrature phase shift keying or quadrature amplitude modulation as directed by a media access control ("MAC") scheduler 535. A resource mapping module 540 of the base station thereafter allocates resources for the user equipment in accordance with the transport information as directed by the media access control scheduler 535. An antenna mapping module 545 of the base station thereafter maps the transport information for antenna ports of an antenna 550 as directed by the media access control scheduler 535 to transmit the transport information over a wireless communication link to the user equipment. A hybrid automatic repeat request module (designated "HARQ") 555 cooperates with the coding module 520 to accommodate retransmissions.

The user equipment receives the transport information via an antenna 557 and an antenna demapping module 560 demaps the transport information from antenna ports of the antenna 557. A resource demapping module 565 demaps the resources allocated to the user equipment from the base station. A data demodulation module 570 demodulates the transport information and a deinterleaving module 575 of the user equipment deinterleaves the transport information transmitted from the base station. A decoding module (designated "Decoding+RM") 580 decodes the transport information using an opposite decoding process to the coding module 520 of the base station and supports retransmits from a hybrid automatic repeat request module (designated "HARQ") 585. The transport information is thereafter provided to a cyclic redundancy check module (designated "CRC") 590 for error detection.

Functionality performed by the base station and the user equipment may be organized and modeled as a stack of physical, transport, and control layers in accordance with the open system interconnection seven-layer model. Among the layers therein is the media access control (also referred to as "MAC") layer and other layers located above the media access control layer such as networking and transport layers. The media access control layer offers certain services to the higher layers including services that are related to the operation of, for instance, an uplink and a downlink (i.e., channels for transmissions from user equipment to the base station, and vice versa). The media access control layer includes an implementation of a media access control protocol. The media access control protocol provides procedures followed by the user equipment and the base station to transmit and receive information therebetween.

A physical layer is located below the media access control layer. The media access control layer requests certain services from the physical layer. These services are related to the physical transmission of packets to the base station. The media access control layer receives one or more flows from the higher layers. A flow is a stream of data, typically corresponding to a specific application such as a voice over internet protocol ("VoIP") communication session, videotelephony, gaming, or the like.

Figure 6:
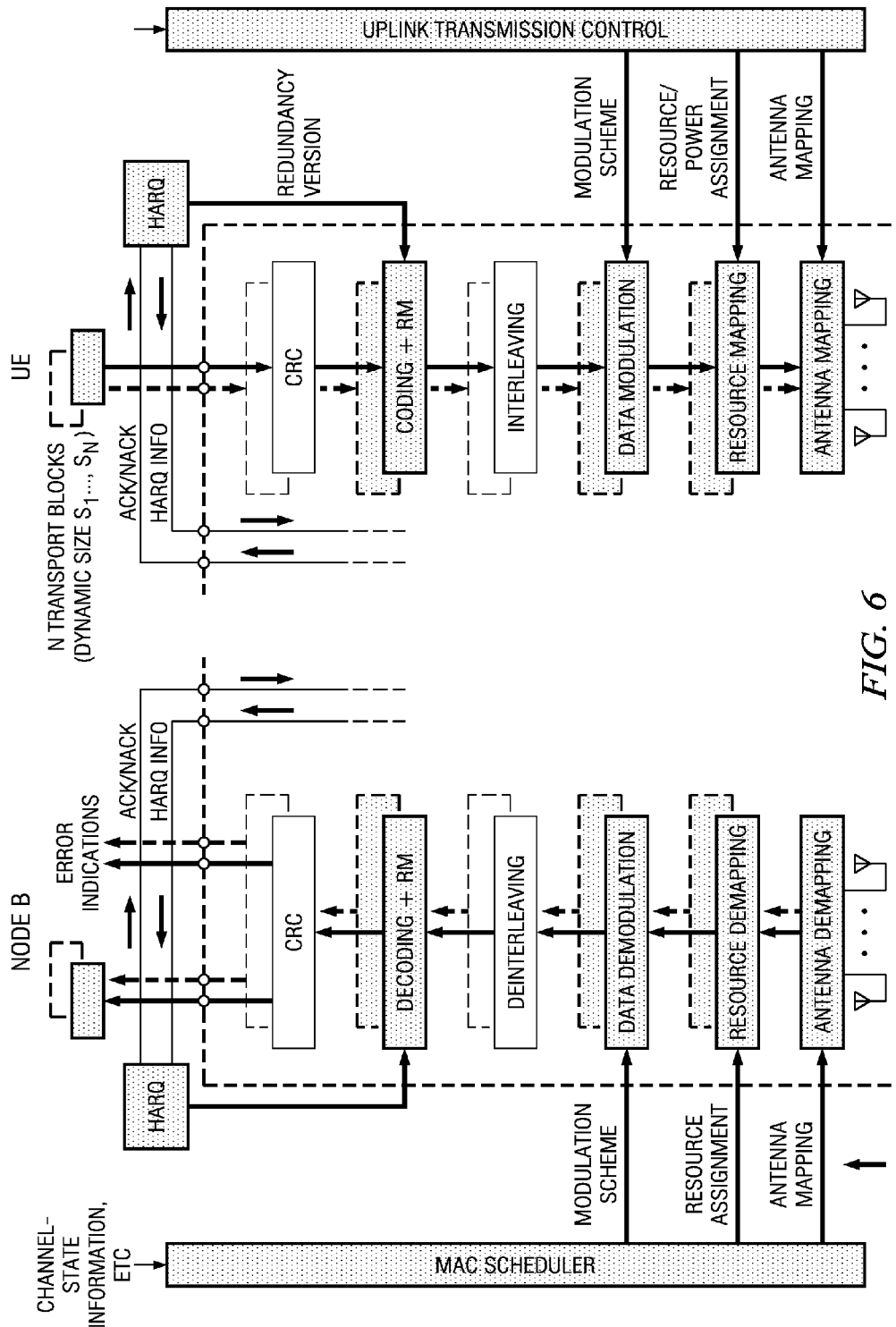

Turning now to FIG. 6, illustrated is a block diagram of an embodiment of user equipment and a base station of a communication system constructed in accordance with the principles of the present invention, illustrating uplink communication from the user equipment to the base station. The elements illustrated in FIG. 6 including the general function of uplink transmission control provide functions corresponding to those illustrated in FIG. 5 for uplink communication from user equipment to a base station, and will not be redescribed in the interest of brevity.

Figure 7:
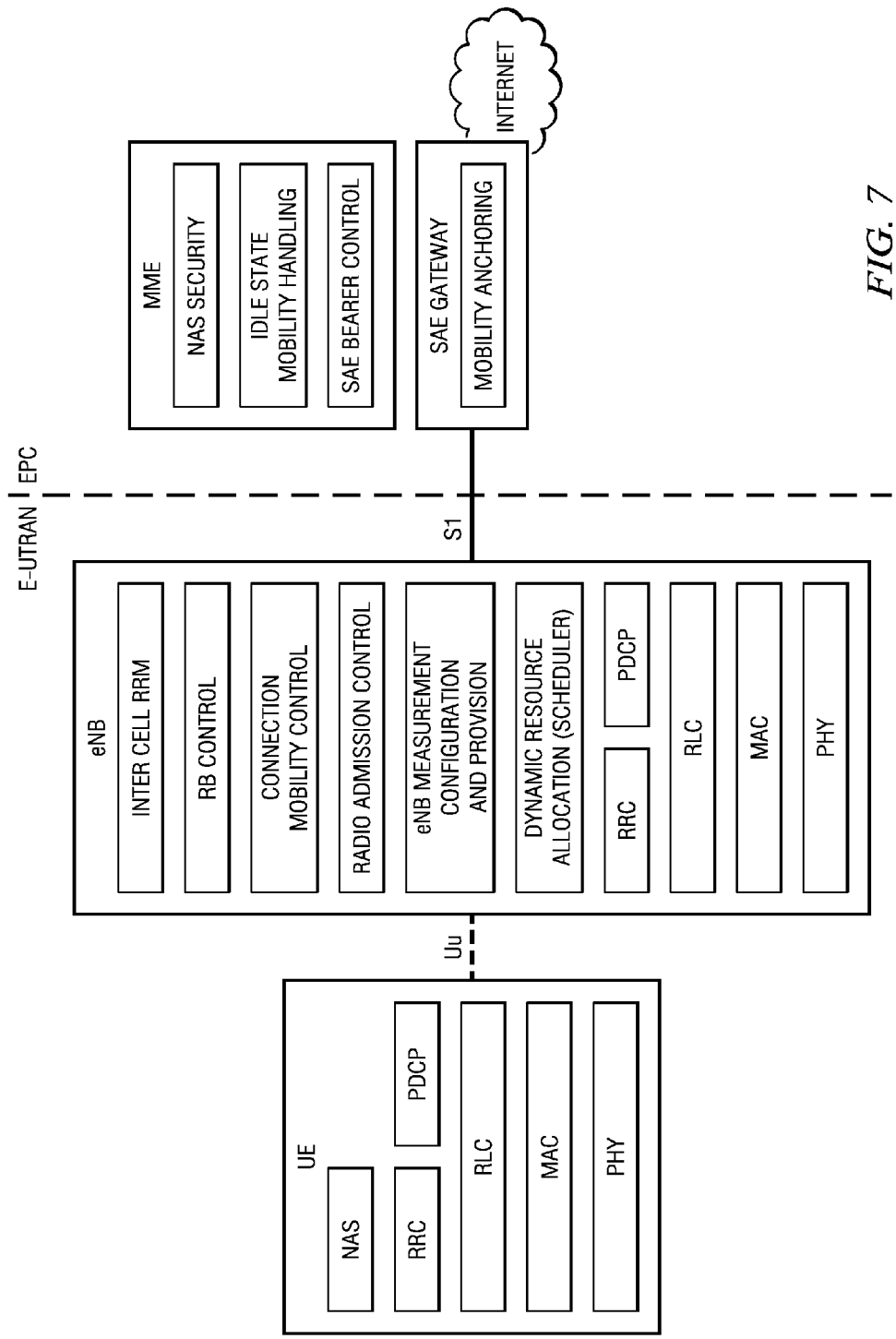
FIG. 7 illustrates a block diagram of an embodiment of user equipment and a base station that provides the exemplary functional layers thereof constructed in accordance with the principles of the present invention.

In order to communicate the physical layer packet format to a user equipment, a compatible physical layer signaling or media access control channel signaling is generally employed. Each media access control layer packet section may include one or more media access control layer payloads in accordance with the media access control layer multi-user packet format. In accordance with the foregoing, FIG. 7 illustrates a block diagram of an embodiment of user equipment and a base station that provides the exemplary functional layers thereof constructed in accordance with the principles of the present invention and compatible with 3GPP TS 36.300, as introduced above.

Figure 8:
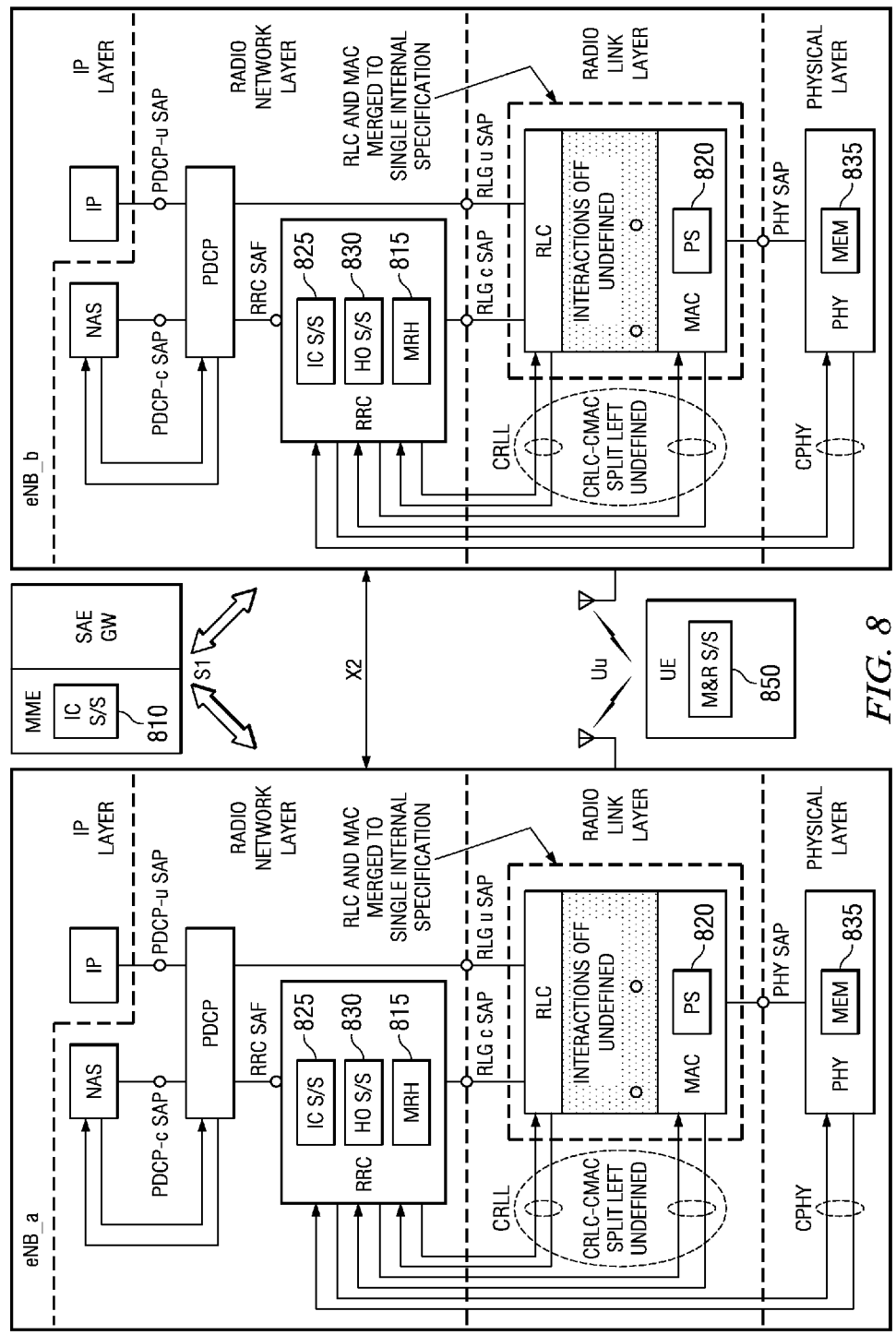
FIG. 8 illustrates a block diagram of an embodiment of user equipment and base stations of a communication system constructed in accordance with the principles of the present invention.

Turning now to FIG. 8, illustrated is a block diagram of an embodiment of user equipment and base stations of a communication system constructed in accordance with the principles of the present invention. A source base station (designated "eNB_a") may perform a handover of user equipment (designated "UE") to a target base station (designated "eNB_b"). The base stations are also connected to a core network including a mobile management entity ("MME")/system architecture evolution gateway ("SAE GW") with an interference coordination subsystem (designated "IC S/S") 810. Among other things, the base stations include a measurement report handler (designated "MRH") 815, packet scheduler (designated "PS") 820, interference coordination subsystem (designated "IC S/S") 825, handover subsystem (designated "HO S/S") 830 and memory (designated "MEM") 835. The measurement report handler 815 in the base stations processes uplink data received from the user equipment such as a reliability report including the channel quality. The packet scheduler 820 allocates uplink and downlink resources within the base stations in accordance with, for instance, a channel quality indicator ("CQI") report from the user equipment. The handover subsystem 830 performs a handover decision sequence based on input from, for instance, the measurement report handler 815, and uses resource and communication performance information to execute the handover of the user equipment to a target base station as described below. The interference coordination subsystem 825 in the base stations adjusts interference coordination parameters in a self-optimization process based on a reliability report (also referred to as or including a channel quality report) from a user equipment as described herein. The memory 835 may be nonvolatile memory associated with data processing in the source base station.

A self-optimization process is a process wherein user equipment and base station measurements and performance measurements are used to auto-tune the communication system. A self-optimization process works in an operational state. An operational state is understood as the state wherein the radio frequency interface is switched on. The functions handled in the operational state include optimization and adaptation.

The user equipment includes, among other things, a measurement and reporting subsystem (designated "M&R S/S") 850 that performs measurements regarding a status of the user equipment and provides reports to the base stations as a function thereof. For instance, the measurement and reporting subsystem 850 may detect a cell status thereof, employ intra-frequency handover measurements to detect its strongest interferers at a cell edge thereof, and compose a reliability report such as a downlink channel quality indicator at the cell edge for the base stations. The user equipment may then notify the strongest interferer (e.g., a target base station in a handover situation) about the measurement results via the reliability report transmitted to the source base station or a reliability report transmitted to the target base station after a handover event. It should also be understood that the user equipment is constructed analogously to the base stations, and that the measurement and reporting subsystem 850 generally resides within the radio resource control module. It should further be understood that the systems, subsystems and modules associated with the system of the present invention may reside in a single module as illustrated, or separated into distributed subsystems, and multiple modules of like functionality may form the systems, subsystems and modules as described herein.

The interference coordination subsystem 810 in the mobile management entity is responsible for an initialization and static configuration of interference coordination functionalities in each base station. For example, in case soft frequency reuse is used as interference coordination in the system, before the communication system begins to operate, the interference coordination subsystem 810 in the mobile management entity configures soft frequency reuse parameters in the base stations with the same power mask, or with different power masks based on experimental results from a drive test. After the communication system starts to operate, the quantity of user equipment communicating with each base station may vary because of, for instance, user equipment mobility. As a result, each base station will have a different and changing interference level. The interference coordination subsystem 825 in the base station is responsible for adjusting the interference coordination parameters in each base station independently as set forth herein to accommodate the dynamics in the communication system such as unbalanced load therein, and user equipment unevenly distributed in the communication system, to name a few.

Regarding the handover sequence, intra-frequency handover is typically triggered when user equipment is in a cell edge of a serving cell associated with a source base station. The need for a handover may also be triggered, for example, by interfering user equipment, by a large number of user equipment loading system resources, or by detection of a failed system element. In a frequency reuse-one communication system wherein adjacent cells reuse the same frequency sub-bands such as employed with a 3GPP LTE compatible communication system, the user equipment may experience strong interference and a low signal-to-noise plus interference ratio [referred to as "SNIR," which equals signal power/ (noise power+interference power), e.g., less than −5 db] on the downlink at a cell's edge of the serving cell. Given such a low signal-to-noise plus interference ratio, the block error rate ("BLER") of a message after an automatic retransmit request ("ARQ") or hybrid automatic retransmit request ("HARQ") may also be very high in some scenarios. This raises the concern whether handover execution signaling (mainly, handover command in the downlink) can be reliably communicated between a base station and user equipment. In other words, this raises the concern whether there is a coverage problem for handover execution signaling in a 3GPP LTE compatible communication system. Furthermore, it also raises the concern whether there is a coverage problem in a cell edge of a base station.

There may be a higher probability of handover when the load on a serving cell is high. If the transmission for the handover command fails, the user equipment typically transitions to an idle state, and starts cell reselection. The procedure due to the failure of the handover command typically causes a long interruption time (e.g., greater than 500 milliseconds). Frequent radio link failure is not desirable, especially for voice over internet protocol ("VoIP") applications.

Communication systems such as the universal mobile telecommunications system ("UMTS") are a frequency reuse-one system. In the universal mobile telecommunications system, soft handover is used to avoid or solve the handover signaling error problem. It has been proposed to employ forward handover signaling (user equipment-based mobility in active state) as a backup (or alternative) to current backward handover signaling. Under such a handover signaling system, the user equipment searches for a new cell if the user equipment did not receive a requested handover command within some period of time (e.g., timeout period). The soft handover and forward handover signaling systems, however, cause significant architectural changes to the 3GPP LTE radio access network ("RAN"), which is not preferable.

Soft handover generally refers to a handover in which the channel in a source cell is retained and used in parallel with a channel in a target cell. The connection to the target cell is established before the connection to the source cell is broken (i.e., it is a make-before-break arrangement). A soft handover may involve connections to more than two cells such that connections to three, four, or more cells can be simultaneously maintained with user equipment, and the best of the used channels can be utilized for the communication session at a given moment, or all the signals can be combined to produce a clearer copy of signal. Alternatively, a hard handover is one in which the channel to the user equipment is released before the channel in the target cell is engaged.

According to a system associated with the principles of the present invention as described in the environment of an exemplary embodiment, the communication system employs self-optimization of an interference coordination scheme. As described above, a base station communicates with a plurality of user equipment within its coverage area by transmitting signals in downlinks in an allocated frequency band to the user equipment. It is noted that the frequency band is typically divided into multiple (e.g., three or five) sub-bands, and a particular user equipment is assigned to one of the multiple sub-bands. Within each sub-band, the base station communicates at a particular transmitter power level to the user equipment assigned thereto over independent channels, the independent channels formed by orthogonal pseudorandom noise sequences. Thus, each user equipment assigned to a particular sub-band receives signals from the base station at a common downlink power level. The overall transmitter power level of the base station is constrained so that the sum of the transmitter power levels in each of the sub-bands is a constant.

A resource allocation process within the base station selectively allocates the relative transmitter power level in each of the sub-bands in view of the communication needs of the user equipment. For example, user equipment within a central portion of the coverage area (i.e., those in an area near the base station or cell center) are assigned to a common sub-band, and the base station communicates in that sub-band at a low power level because the communication distances are relatively small. User equipment at the edge of the coverage area (e.g., cell edge) is assigned to a different sub-band, and the base station communicates with the user equipment at the edge at a high power level.

The frequency (or time) resources are divided into different power-level groups. The frequency bandwidth and the power levels are predefined during the communication system planning phase. The relative power levels of the sub-bands are generally referred to as a "power mask" (e.g., a soft frequency reuse parameter, a type of interference coordination parameter) and is expressed as a sequence of numbers indicating the power levels in lower power sub-bands relative to the power level in the highest power sub-band. For example, the power mask sequence (0 dB, −4 dB, −4 dB) indicates that the power levels of the second and third sub-bands are each 4 dB below the power level of the first sub-band.

Typically, the communication system allocates radio resources in a high power sub-band to user equipment at the cell edge, and allocates radio resources in a low power sub-band to user equipment at the cell center. By increasing the power difference between high power and low power sub-bands, the communication system can increase the throughput of user equipment at the cell edge at the cost of reducing throughput of user equipment at the cell center. By decreasing the power difference between high power and low power sub-bands, the communication system can increase the throughput of user equipment at the cell center at the cost of reducing the throughput of user equipment at the cell edge.

It should be understood that the system and method of the present invention is applicable to various interference coordination schemes including soft frequency reuse. In other interference coordination schemes, self-optimization is realized by adjusting other interference coordination parameters such as, without limitation, an antenna pattern, a transmission power, a transmission frequency, and a transmission time. In addition, the use of beamforming antenna solutions at the base station is a general method that can be employed for downlink inter-cell interference mitigation.

In a soft frequency reuse and a handover situation, the handover command is typically sent from a source base station's high power sub-band (a cell edge sub-band), and interfered by the target base station's low power sub-band (a cell center sub-band). Also, the target base station is often the strongest interferer to a reception of the handover command By reducing a transmission power of the target base station's low power sub-band, the user equipment can get higher signal-to-noise plus interference ratio for the handover command and data control at the source base station. As a result, the user equipment can achieve higher cell edge throughput and can receive a handover command more reliably. On the other hand, if the handover command is reliable and/or cell edge throughput is high, the power of the low power sub-band of the target base station can be increased, which will increase the target base station's throughput.

Based thereon, the user equipment may report the channel quality that the user equipment experienced within the last handover procedure to the target base station after handover. This improves both the reliability of the handover command and user equipment's throughput at the cell edge. Alternatively, the user equipment may send the reliability report of a handover command (e.g., in the format of radio link failure or the number of automatic retransmit request events) to the target base station, even if a handover is unsuccessful.

Figure 9:
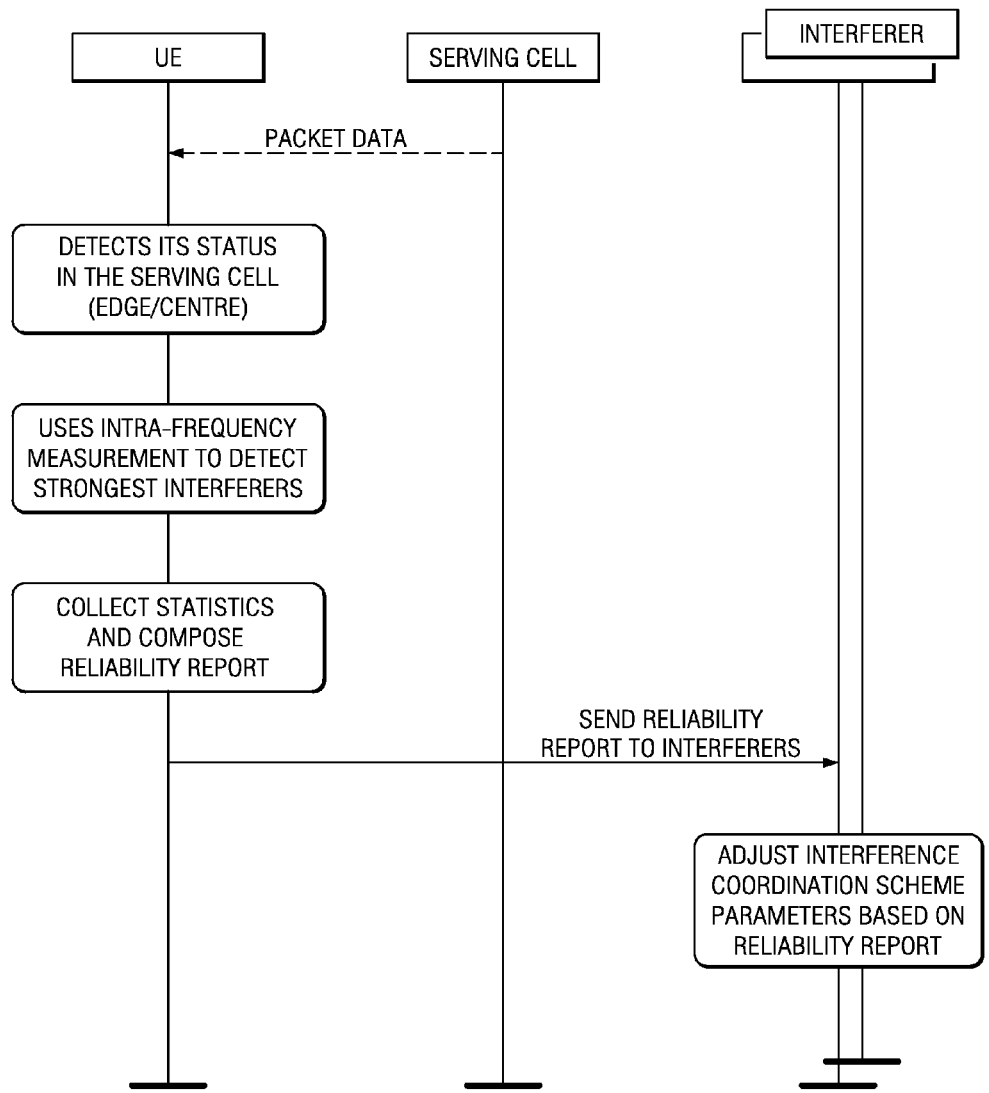
FIG. 9 illustrates a signaling diagram of an embodiment of performing self-optimization according to the principles of the present invention.

Regarding cell interference, FIG. 9 illustrates a signaling diagram of an embodiment of performing self-optimization according to the principles of the present invention. After receiving packet data from a source base station in a serving cell, a user equipment (designated "UE") detects a cell status thereof (cell edge or cell status) via various approaches such as via a dedicated radio resource control signal, broadcast signal, information from a packet scheduler, or a special event (e.g., handover, radio link failure). The user equipment employs intra-frequency handover measurements to detect its strongest interferers at a cell edge thereof. The user equipment composes a reliability report such as a downlink channel quality indicator at the cell edge. This measurement indicates whether a current configuration of interference coordination is proper, too aggressive, or too conservative. The reliability report may include at least one of, without limitation, a channel quality indicator report of source base station's (from the serving cell) downlink, a radio link failure, a number of automatic retransmit requests/hybrid automatic retransmit requests of a handover command, and an average number of automatic retransmit requests/hybrid automatic retransmit requests when the user equipment is in a cell edge thereof.

The user equipment then notifies the strongest interferer about the measurement results via, without limitation, a reliability report transmitted to the source base station in the serving cell or a reliability report to a target base station in a target cell after a handover event. In the second option, the message can be sent as a separate radio resource control message or attached to a radio resource control message exchanged in a handover process such as handover confirm. The strongest interferer then adjusts an interference coordination parameter based on the reliability report. In a handover situation, the strongest interferer is usually the target base station.

Again, the strongest interferer uses the reliability report to adjust an interference coordination parameter (e.g., a power mask if soft frequency reuse scheme is used). When the report indicates poor or bad results, the strongest interferer can reduce transmission power or reduce the traffic at its cell center sub-band, which increases the source base station's cell edge throughput. In the case of handover, this can increase the reliability of the handover command. When the report indicates good results, the strongest interferer can increase transmission power at its cell center sub-band. As a result, this can increase the strongest interferer's cell center throughput. In a handover situation, this can improve cell center throughput in the target cell.

The system and method as described herein may be implemented as set forth below. Within the handover procedure, the user equipment may collect at least one of the following statistics, without limitation, the downlink channel quality indicator of source base station's downlink at the time of handover command reception, a radio link failure, and the number of times for an automatic retransmit request/hybrid automatic retransmit request for retransmission of the handover command. The user equipment reports the statistics in the form of a reliability report to the target base station along with a handover confirmation (when the handover succeeds) or a re-establishment request (or similar message after handover failure).

After receiving the report, the target base station adjusts the interference coordination parameters. As an example, if one of the following conditions is true, namely, the signal-to-noise plus interference ratio of the handover command is less than a lower-bound of a signal-to-noise plus interference ratio threshold, a radio link failure is observed, or the number of automatic retransmit request/hybrid automatic retransmit request retransmissions is greater than a higher-bound retransmission threshold, then the target base station reduces power at the low power sub-band (cell center sub-band) of the target cell [e.g., (0, −4 db, −4 db) to (0, −6 db, −6 db)]. Another approach is to select the type of packet scheduler procedure and/or the parameters in the packet scheduling procedure to allow a lower level of traffic in the cell center sub-band. This improves the signal-to-noise plus interference ratio of the handover command and data channel for user equipment at the source base station's cell edge, at the potential cost of reducing throughput for the user equipment at the target base station's cell center.

As another example, if one of the following conditions is true, namely, that the signal-to-noise plus interference ratio of the handover command is less than a higher-bound signal-to-noise plus interference ratio threshold, or the number of automatic retransmit request/hybrid automatic retransmit request retransmissions is less than a lower-bound retransmission threshold, the target base station can increase power at low power sub-band of the target cell [e.g., (0, −4 db, −4 db) to (0, −2 db, −2 db)]. This increases throughput for user equipment at the target's cell center, at the potential cost of reducing signal-to-noise plus interference ratio of the handover command and data channel for user equipment within the source base station's cell edge. Since the report from the user equipment indicates good channel quality, it will not seriously affect the reliability of the handover command in the source base station. Some time domain sliding window techniques can also be applied to improve statistical reliability.

Figure 10:
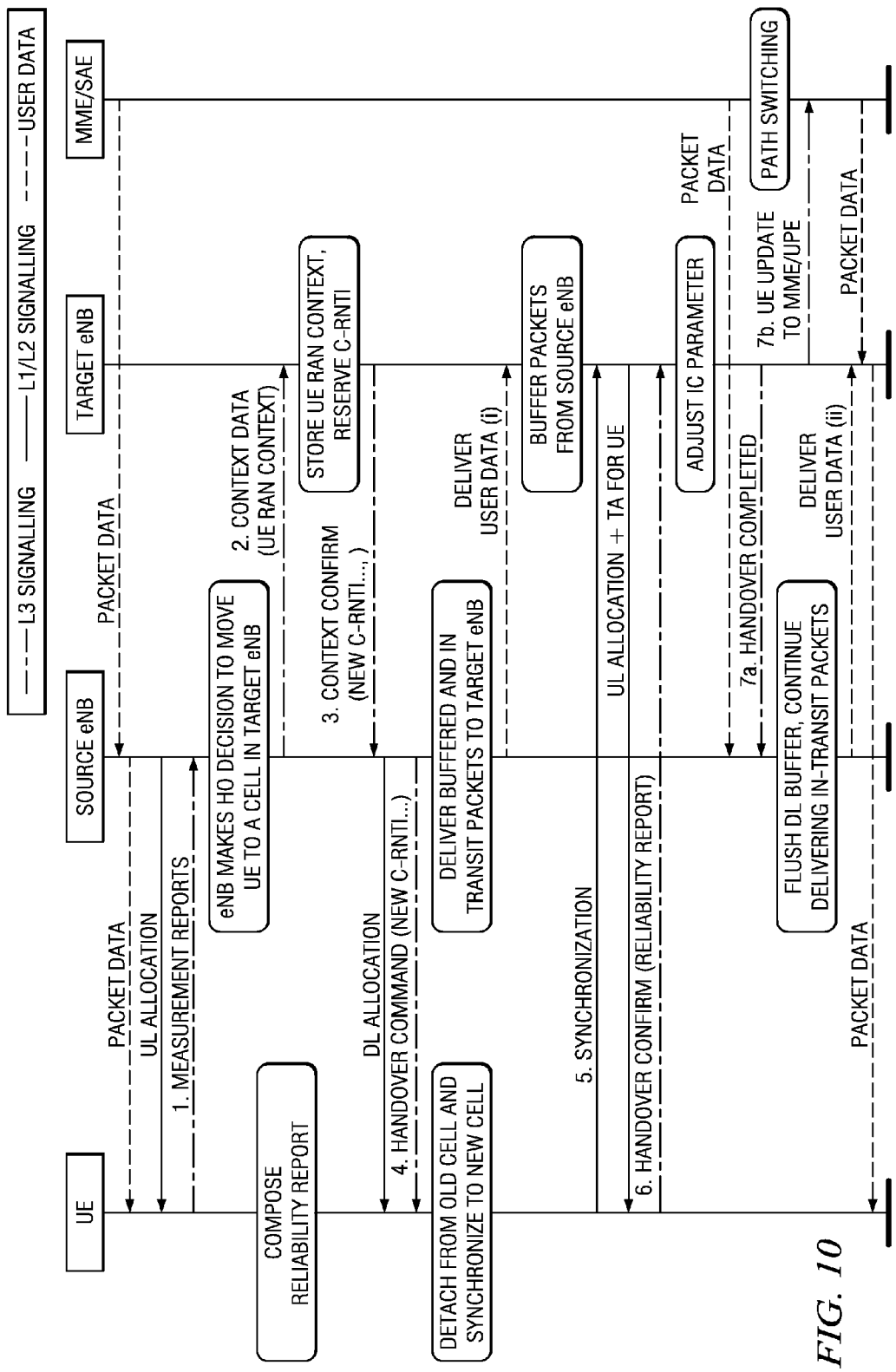
FIGS. 10 and 11 illustrate signaling diagrams of an embodiment of a handover sequence according to the principles of the present invention.
Figure 11:
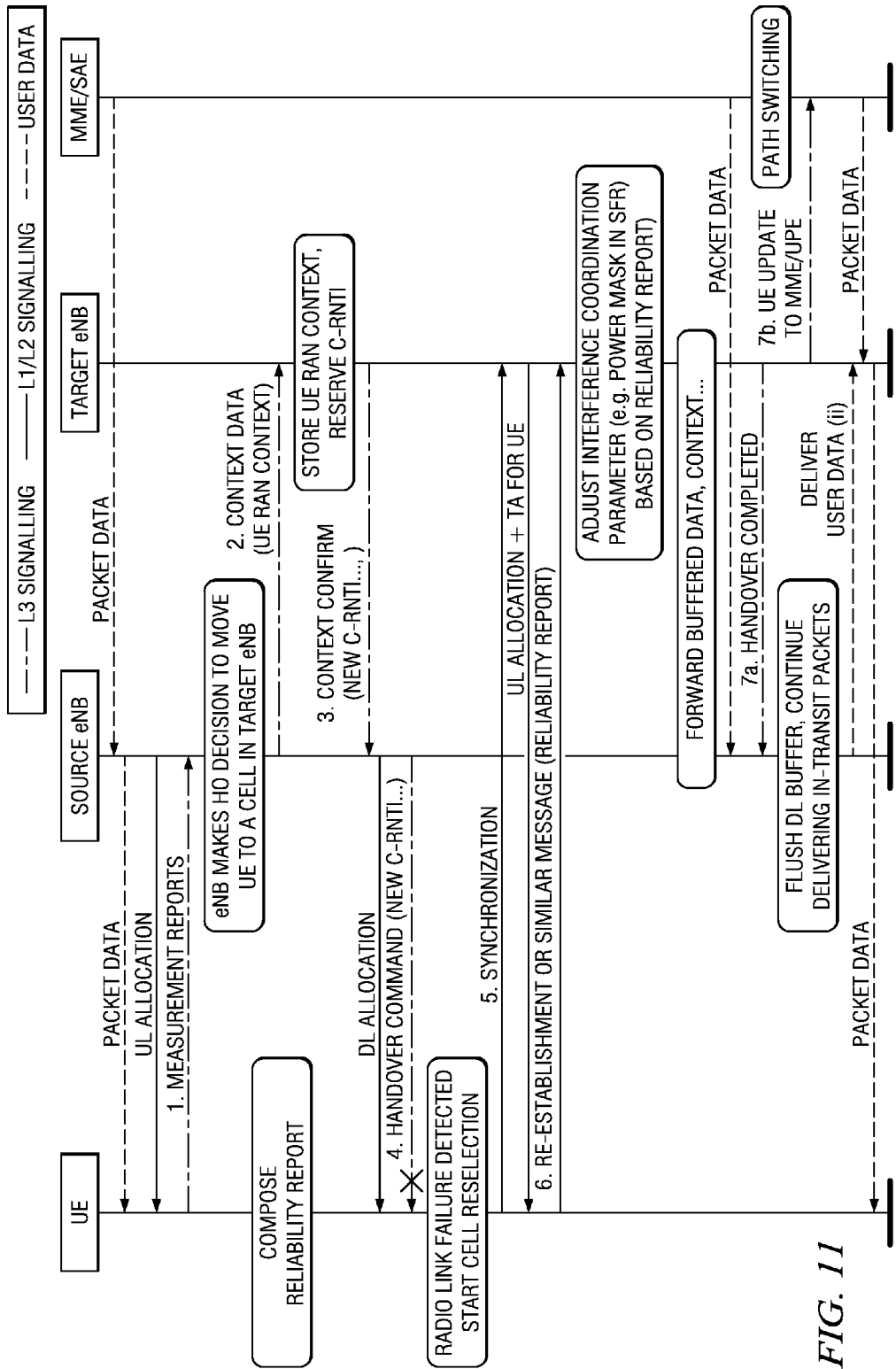

Turning now to FIGS. 10 and 11, illustrated are signaling diagrams of an embodiment of a handover sequence according to the principles of the present invention. More specifically, FIGS. 10 and 11 demonstrate successful and failed handover sequences, respectively. The handover sequence begins with transmitting a downlink allocation from a source base station (designated "Source eNB") to user equipment (designated "UE"). The user equipment transmits a reliability report to the source base station. The source base station then determines if a target base station (designated "Target eNB") has sufficient resources to accommodate the user equipment and, if so, transmits a handover command from the source base station to the user equipment. The target base station allocates resources in an uplink shared channel for use by the user equipment to transmit access bursts.

The user equipment then transmits a handover confirmation message (see FIG. 10) or a re-establishment message (see FIG. 11) with a reliability report to the target base station.

Note that in FIG. 11, the user equipment still selects the target cell to connect after radio link failure. It is also possible that the user equipment may select a different new cell than the target cell in accordance with the principles of the present invention. Under such circumstances, the user equipment can transmit the reliability report to the target cell via the new cell. The target base station then adjusts an interference coordination ("IC") parameter based on the reliability report. If the reliability report indicates poor results, the target base station reduces transmission power or reduces the traffic at a cell center sub-band thereof. If the reliability report indicates good results, the target base station can increase transmission power at the cell center sub-band thereof. The target base station thereafter completes the handover procedure with the source base station to the target base station and access bursts are transmitted from the user equipment to the target base station. It should be understood that the reliability report includes any one of or combinations of the statistics described above.

With respect to the user equipment, there are several mechanisms that may be employed to capture a status thereof. For instance, the user equipment may be aware of its cell status (cell edge or cell status) via various approaches such as dedicated radio resource control ("RRC") signaling, broadcast signaling, information from a packet scheduler, a special event such as handover, and radio link failure. The user equipment may also use intra-frequency handover measurement to detect its strongest interferers when at a cell's edge. (See, e.g., 3GPP TSG RAN WG1 #47bis meeting contribution R1-070390, entitled Open Loop DL Transmit Diversity for Common Control Channels," by Nokia, Jan. 15-19, 2007, which is incorporated herein by reference).

The user equipment can also use a channel quality indicator measurement to know the user equipment's downlink channel quality at the cell edge. This measurement indicates whether the current configuration of interference coordination is proper, too aggressive, or too conservative. The user equipment can also notify the strongest interferers about the measurement results via a reliability report via a current serving cell, and a reliability report to a target cell after a handover. In the second option, the message can be sent as a separate radio resource control message, or attached to part of the radio resource control message exchanged in a handover process such as handover confirmed.

Figure 12:
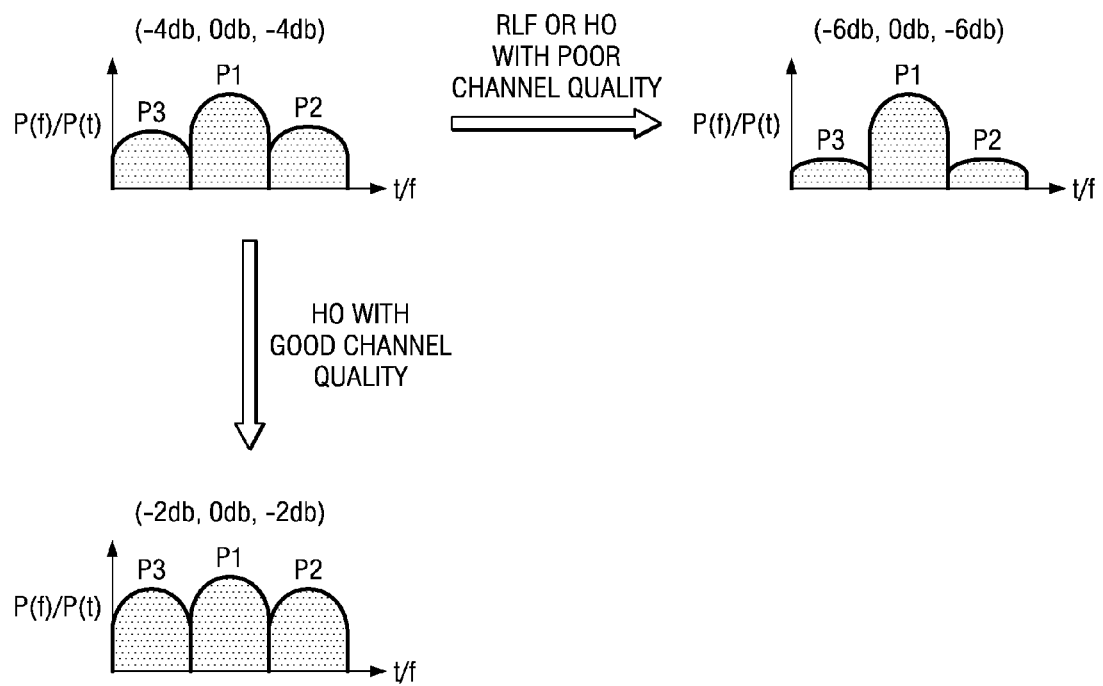
FIG. 12 illustrates a diagram of an embodiment for performing a handover sequence according to the principles of the present invention.

Turning now to FIG. 12, illustrated is a diagram of an embodiment for performing a handover sequence according to the principles of the present invention. As illustrated herein, when the user equipment reliability report indicates poor channel quality, the target base station changes a power mask for power levels P3, P1 and P2 for sub-bands 3, 1 and 2, respectively, from (−4 db, 0, −4 db) to (−6 db, 0, −6 db). This reduces the interference on the source base station's cell edge sub-band. If another user equipment moves from the source base station to the target base station at a later time, it will experience better signal-to-noise plus interference ratio before and during the handover. On the other hand, another good effect is that the user equipment in source base station's cell edge sub-band experiences better throughput and signal-to-noise plus interference ratio. When the user equipment's reliability report indicates good channel quality, the target base station changes a power mask for power levels P3, P1 and P2 for sub-bands 3, 1 and 2, respectively, from (−4 db, 0, −4 db) to (−2 db, 0, −2 db). This increases target cell's throughput at cell center sub-band, but potentially increases the interference on source base station's cell edge sub-band. Since user equipment's reliability report indicates good channel quality, this will not seriously affect the reliability of handover command in source base station.

The system as described herein is related to PCT Patent Application No. PCT/IB2008/000264, entitled "Method and Apparatus for providing Interference Coordination in Handover Signaling," by Huang, filed Feb. 6, 2008, claiming priority to U.S. Patent Application Ser. No. 60/888,516, which is incorporated herein by reference. Huang describes a method that includes transmitting a report to a source base station, specifying a target base station as an interference source. The source base station coordinates a handover procedure with the target base station to reduce interference stemming from the target base station.

The handover system as described herein increases a reliability of the handover command and throughput of data channel at a cell's edge. It is typically a reactive approach, which means that the target base station takes action after radio link failure or a poor handover command reception is identified. The handover system avoids complicated inter-cell interference coordination functionality (distributed or centralized operations and maintenance server) to manage interference mapping (which base station is the strongest interferer to which user equipment), and avoids extra signaling to update and maintain the interferer, and signaling of interference coordination in existing inter-cell interference coordination schemes. The handover system also may also avoid signaling on the X2 interface as described above. Instead, the user equipment may report its performance at cell edge along with the information such as the measured channel quality indicator or the events of a successful/failed handover.

Reliability of handover signaling may become a bottleneck to a 3GPP LTE compatible communication system. In comparison to existing solutions such as forward handover or soft handover, the handover system according to the principles of the present invention employs current system architectures with a similar level of gain regarding coverage and reliability of handover signaling.

Thus, a system and method have been introduced to perform base station optimization in a communication system. In one embodiment, after receiving packet data from a source base station in a serving cell, a user equipment detects a cell status thereof, employs intra-frequency handover measurements to detect its strongest interferers at a cell edge thereof, and composes a reliability report including a downlink channel quality report at the cell edge (e.g., by a measurement and reporting subsystem in the user equipment). The user equipment then notifies the strongest interferer (e.g., a target base station in a handover situation) about the measurement results via a reliability report transmitted to the source base station or a reliability report transmitted to the target base station after a handover event (e.g., by the measurement and reporting subsystem in the user equipment and received by the measurement report handler in the base stations). The strongest interferer then adjusts interference coordination parameters based on the reliability report (e.g., by a interference coordination subsystem). When the report indicates poor or bad results, the strongest interferer can reduce transmission power or reduce the traffic at its cell center sub-band, which increases the source base station's cell edge throughput (e.g., in the case of handover, this can increase the reliability of the handover command) When the report indicates good results, the strongest interferer can increase transmission power at its cell center sub-band, which increases the strongest interferer's cell center throughput (e.g., in a handover situation, this can improve cell center throughput in the target cell).

In another embodiment, a system and method are introduced for use in a communication system to coordinate allocation of resources for user equipment to be handed over from a source base station to a target base station. The method includes transmitting an uplink allocation from the source base station to the user equipment (e.g., by a packet scheduler) and transmitting a measurement report from the user equipment to the source base station (e.g., by a measurement and reporting subsystem in the user equipment). The method also includes composing a reliability report from a user equipment (by the measurement and reporting subsystem in the user equipment), determining if the target base station has sufficient resources to accommodate the user equipment (e.g., by a packet scheduler), transmitting a handover command from the source base station to the user equipment (e.g., by a handover subsystem), allocating resources in an uplink shared channel in the target base station for use by the user equipment to transmit access bursts (e.g., by a packet scheduler) and transmitting a handover confirmation message or a re-establishment message with a reliability report (e.g., a channel quality indicator report) from the user equipment to the target base station (by the measurement and reporting subsystem in the user equipment). The method continues by adjusting an interference coordination parameter based on the reliability report (e.g., by a interference coordination subsystem). If the reliability report indicates poor results, the target base station reduces transmission power or reduces the traffic at a cell center sub-band thereof. If the reliability report indicates good results, the target base station can increase transmission power at the cell center sub-band thereof. The method concludes by completing the handover procedure from the source base station to the target base station (e.g., by handover subsystems), and transmitting access bursts from the user equipment to the target base station.

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to advantageously coordinate allocation of resources for user equipment to be handed over from a source base station to a target base station without contention and without a need for sharing timing information therebetween, as described herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. An apparatus, comprising:
at least one processor; and
at least one memory including computer program code,
wherein the at least one memory and the computer program code are configured to, with the at least one processor, cause the apparatus at least to
receive a reliability report; and
adapt, in response to said reliability report, a power mask by differently adapting at least two sub-bands of said power mask,
wherein the apparatus is configured to reduce transmission power or traffic when the reliability report indicates at least one poor or bad result,
wherein the apparatus is configured to increase transmission power or traffic when the reliability report indicates at least one good result, and
wherein the reliability report is received from an intra-frequency neighbor base station.
2. The apparatus of claim 1, wherein said sub-bands are allocated for data transmissions in different regions of a coverage area of said apparatus.
3. The apparatus of claim 2, wherein at least one region of said different regions is a cell-edge region or a cell-center region.
4. The apparatus as recited in claim 1, wherein the at least one memory and the computer program code are further configured to, with the at least one processor, cause the apparatus at least to allocate uplink and downlink resources for said apparatus in accordance with said adapted power mask.
5. The apparatus as recited in claim 1, wherein the reliability report is received from a user equipment operating in a served area of another apparatus.
6. The apparatus as recited in claim 1, wherein the at least one memory and the computer program code are further configured to, with the at least one processor, cause the apparatus at least to perform a handover decision sequence for a user equipment as a function of said reliability report.
7. The apparatus as recited in claim 1, wherein the reliability report is attached to a radio resource control message exchanged in a handover process.
8. The apparatus as recited in claim 1, wherein said reliability report includes at least one of intra-frequency handover measurements to detect a strongest interferer for a user equipment, a channel quality indicator report of a downlink of said apparatus, a radio link failure, a number of automatic retransmit requests/hybrid automatic retransmit requests of a handover command, or an average number of automatic retransmit requests/hybrid automatic retransmit requests when said user equipment is in an edge of an area served by said apparatus.
9. The apparatus as recited in claim 1, wherein the at least one memory and the computer program code are further configured to, with the at least one processor, cause the apparatus at least to adapt, in response to said reliability report, at least one of an antenna pattern, a transmission frequency, a transmission time, or a level of traffic in a center sub-band of an area served by said apparatus.
10. A method, comprising:
receiving a reliability report; and
adapting, in response to said reliability report, a power mask by differently adapting at least two sub-bands of said power mask, wherein the adapting is performed by an apparatus, wherein the apparatus is configured to reduce transmission power or traffic when the reliability report indicates at least one poor or bad result, wherein the apparatus is configured to increase transmission power or traffic when the reliability report indicates at least one good result, and wherein the reliability report is received from an intra-frequency neighbor base station.

11. The method of claim 10, further comprising:
allocating said sub-bands for data transmissions in different regions of a coverage area of said apparatus.

12. The method as recited in claim 10, further comprising:
allocating uplink and downlink resources for said apparatus in accordance with said adapted power mask.

13. The method as recited in claim 10, further comprising:
performing a handover decision sequence for a user equipment as a function of said reliability report.

14. The method as recited in claim 10, further comprising:
adapting, in response to said reliability report, at least one of an antenna pattern, a transmission frequency, a transmission time, or a level of traffic in a center sub-band of an area served by said apparatus.

15. A non-transitory computer-readable medium encoded with instructions that, when executed in hardware, perform a process, the process comprising:
receiving a reliability report; and
adapting, in response to said reliability report, a power mask by differently adapting at least two sub-bands of said power mask, wherein the adapting is performed by an apparatus, wherein the apparatus is configured to reduce transmission power or traffic when the reliability report indicates at least one poor or bad result, wherein the apparatus is configured to increase transmission power or traffic when the reliability report indicates at least one good result, and wherein the reliability report is received from an intra-frequency neighbor base station.

16. The non-transitory computer-readable medium of claim 15, the process further comprising:
allocating said sub-bands for data transmissions in different regions of a coverage area of said apparatus.

17. The non-transitory computer-readable medium of claim 15, the process further comprising:
allocating uplink and downlink resources for said apparatus in accordance with said adapted power mask.

18. The non-transitory computer-readable medium of claim 15, the process further comprising:
performing a handover decision sequence for a user equipment as a function of said reliability report.

19. The non-transitory computer-readable medium of claim 15, the process further comprising:
adapting, in response to said reliability report, at least one of an antenna pattern, a transmission frequency, a transmission time, or a level of traffic in a center sub-band of an area served by said apparatus.

* * * * *